Oct. 7, 1924.
J. A. WINTROATH ET AL
THRUST BEARING
Filed Aug. 19, 1920    4 Sheets-Sheet 4
1,510,814
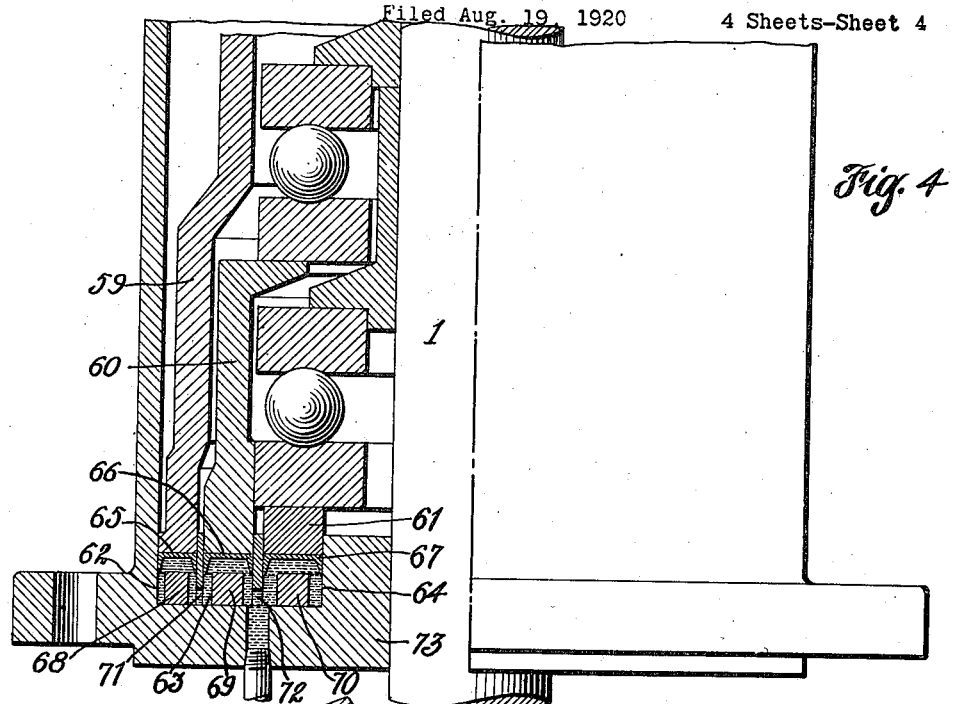
Fig. 4
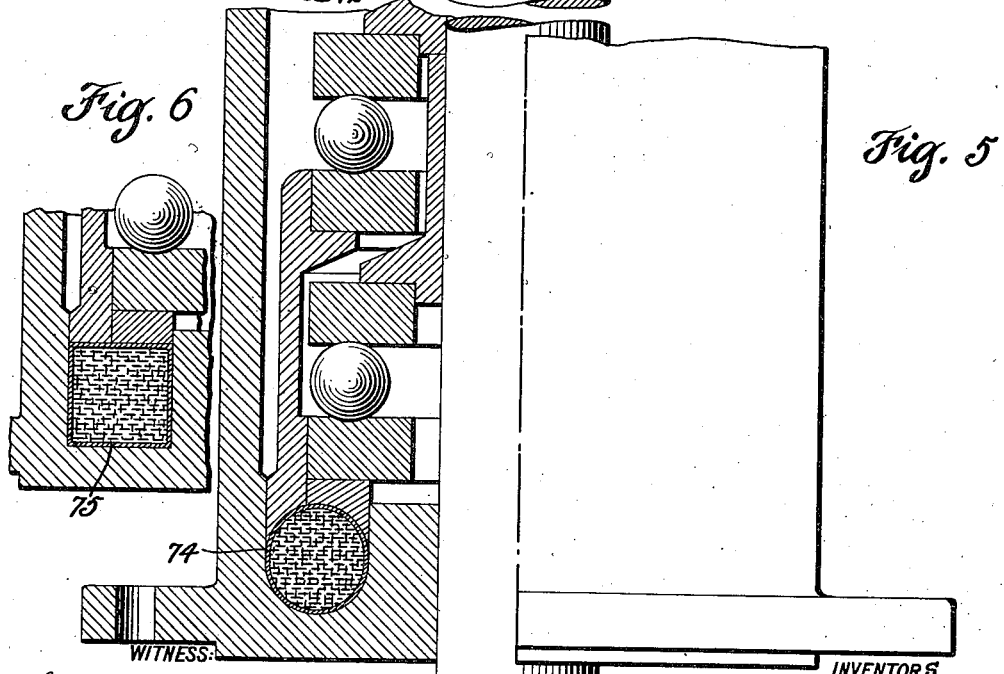
Fig. 6
Fig. 5
WITNESS:
Gustav Genzlinger
INVENTORS
John A. Wintroath
Samuel N. Hall
Mahlon C. Layne
BY
Synnestvedt & Lechner
ATTORNEYS Patented Oct. 7, 1924.

1,510,814

UNITED STATES PATENT OFFICE.

JOHN A. WINTROATH, SAMUEL N. HALL, AND MAHLON E. LAYNE, OF LOS ANGELES, CALIFORNIA.

THRUST BEARING.

Application filed August, 19, 1920. Serial No. 404,579.

*To all whom it may concern:*

Be it known that we, JOHN A. WINTROATH, SAMUEL N. HALL, and MAHLON E. LAYNE, citizens of the United States, residing at Los Angeles, in the county of Los Angeles and State of California, SAMUEL N. HALL in the county of Los Angeles and State of California, and MAHLON E. LAYNE in the county of Los Angeles and State of California, respectively, have invented certain new and useful Improvements in Thrust Bearings, of which the following is a specification.

This invention relates to end thrust receiving devices and is particularly useful in connection with supporting the revolving drive shaft of a rotary deep well pump, but it is not limited to this use for it can, with but slight modification, be applied to any revolving shaft subject to end thrusts.

The principal object of the invention is to distribute this thrust load equally between two or more bearings. More specifically stated, the object of our invention is the provision of a grease or fluid equalized bearing. Other objects more closely associated with the specific and actual structure now to be described will appear.

Figure 1:
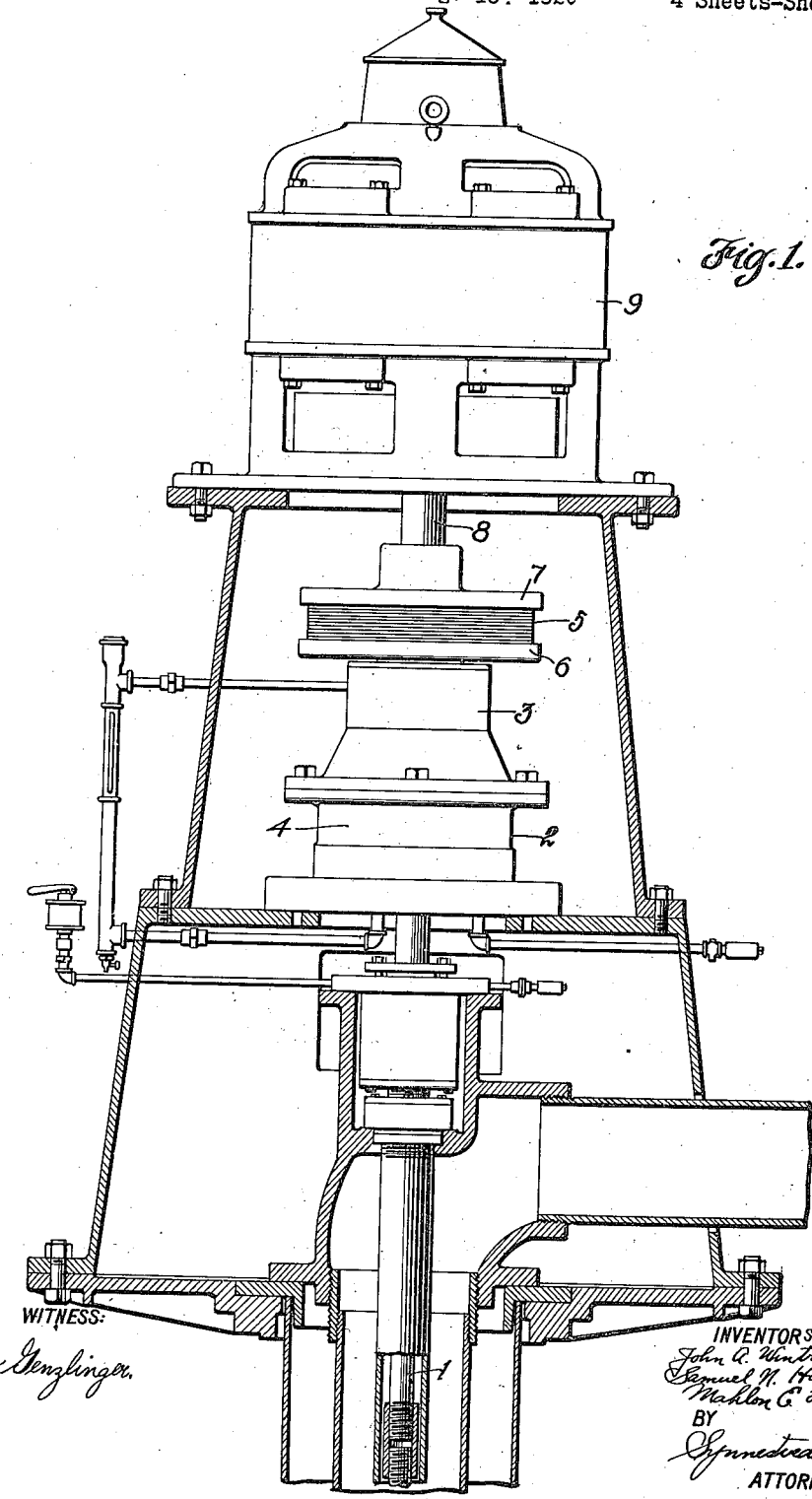
Figure 2:
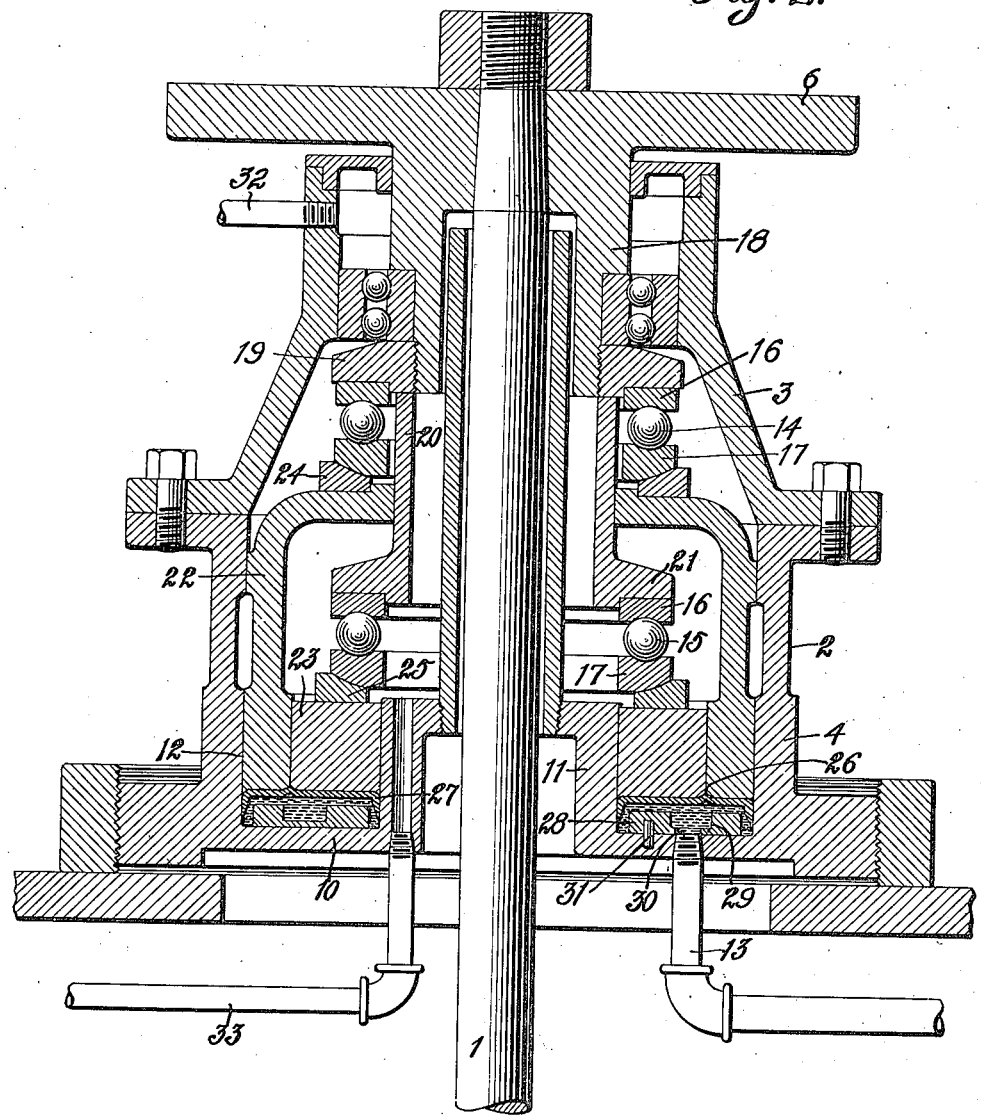

We have illustrated our invention in its preferred form as applied to the driving shaft of a rotary deep well pump and, referring to the drawing, Figure 1 is a side view of a pump head, partly in elevation and partly in section, illustrating, in the general combination there disclosed, our improved thrust bearing; Figure 2 is a central longitudinal section through the bearing of Figure 1; Figures 3, 4, 5, and 6 are views similar to that of Figure 2 except that but half the bearing is shown in section, the other half being in elevation, showing various modifications of our invention.

Turning first to Figures 1 and 2, the revolving shaft 1 extends up through various parts of the construction which are of themselves not of the present invention and need not therefore be specifically described, into and through the housing 2 which encloses the thrust bearing and which is made in two sections, an upper section 3 and a lower section 4, both of them being flanged at their meeting edges in order that they may be readily bolted together. This shaft 1 terminates in a flexible coupling 5, one member 6 of which is firmly fastened to the shaft in any desired or suitable manner. The upper member 7 of this flexible coupling is connected by means of the shaft 8 to the operating motor contained within the casting 9.

The specific construction of the thrust bearing contained within the housing 2, shown in elevation in Figure 1, is shown in longitudinal section in Figure 2 and will now be described. The lower section 4 of the housing 2 is cast with a base 10 and an inner upstanding portion 11, which construction forms an annular groove or cup shaped container 12, into which grease or other fluid may be forced through the pipe 13 threaded into an opening in the base 10.

The thrust load of the revolving shaft 1 is to be divided equally between the two superposed ball bearings 14 and 15 provided with upper and lower ball races or plates 16 and 17. Threaded into the lower end of the extension 18 of member 6 we have provided a load distributing ring 19, which carries the thrust of the shaft partly to the upper race of the bearing 14 and partly to the upper end of the sleeve 20. This sleeve 20 extends down past the bearing 14 and within the same and is provided at its lower end with a suitable flange 21 adapted to rest upon the upper race plate 16 of the bearing 15.

Associated with these bearings, 14, and 15, are suitable bushings 22 and 23, the bushing 22 surrounding at its lower end the bushing 23, and both of these bushings together fitting snugly into the groove 12. The bushing 22 must be so constructed as to surround and extend past the bearing 15 and its associated parts. Between the lower race plate 17 of bearing 14 and the upper end of bushing 22 is provided a ring 24, and between the lower race plate 17 and bearing 15 and the bushing 23 is provided a similar ring 25.

The under faces of the lower ends of the bushings 22 and 23 are substantially flush and are provided at their meeting edges with oppositely rounded corners in order to provide the small groove 26 for a purpose which will be described below.

Beneath the bushings 22 and 23 is a flexible, yielding diaphragm in the form of an annular cup leather 27. It will thus be seen that if grease or other fluid under proper pressure is forced into the groove 12 beneath this cup leather 27, the bearings 14 and 15, through the medium of their respective bushings 22 and 23, will be yieldingly supported upon the upper surface of the cup leather in such a way that any inequality in the proportion of the load which each is carrying will be immediately compensated for through the medium of the leather and the grease or other fluid. The cup leather 27 is forced into the groove 26 which aids in great measure to overcome the tearing action on the leather due to the slight relative vertical movement between the two bushings 22 and 23.

Should the pressure of the grease beneath the leather 27 be removed for any reason, it is undesirable to have the bearings and the structure they are supporting drop below a certain point and in order to prevent this, we provide the ring 28. This ring has in its upper face an annular groove 29 communicating by means of a suitable opening 30 with the fluid pressure supply pipe 13, alinement with which is maintained by means of the dowel pin 31 between the ring and the base 10.

Lubricant may be supplied to the bearings 14 and 15 through the pipes 32 and 33.

It will be noted that the thickness of bushing 23 is greater than that of bushing 22. These are so designed in order to provide substantially equivalent bearing areas on their under faces which rest upon the cup leather 27. This is necessary in order that proper equalization between the two bearings may take place.

Figure 3:
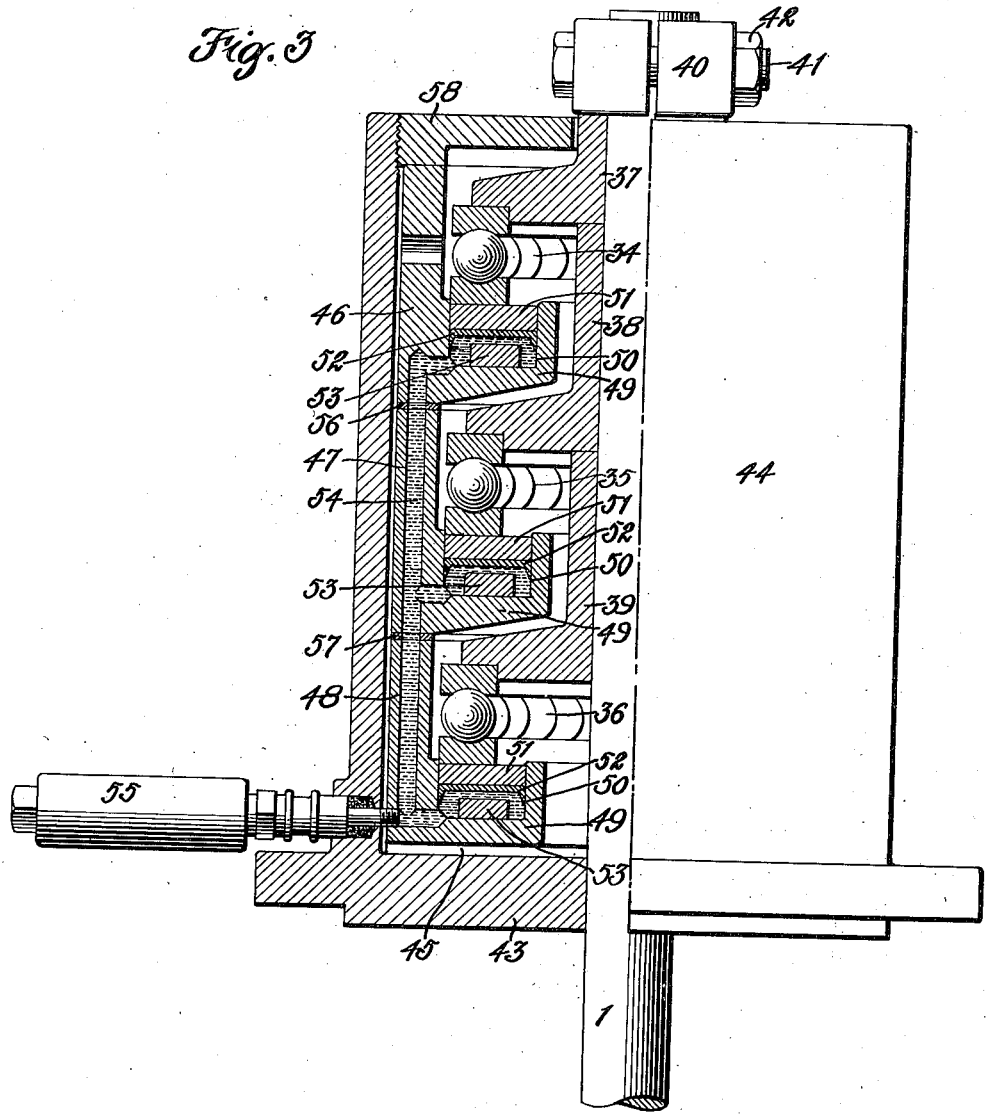

In the modification of Figure 3 we have shown three superposed bearings 34, 35 and 36 to which the load of the shaft is transmitted through the flanged collars or sleeves 37, 38 and 39 and the split ring 40 clamped around the shaft by means of the bolt 41 and the nut 42. Each of these bearings is surrounded with a section of an annular supporting housing which rests upon the base 43 of the casing 44, the passage way 45 being merely a transverse lubricating passage. The sections which we have numbered 46, 47 and 48 are each provided with an inwardly projecting flange or shelf-like portion 49 in which is formed an annular groove 50 similar to the groove 12 illustrated in Figure 2. A ring 51, upon which the bearing rests, fits snugly within this groove 50, immediately below which is the cup leather flexible diaphragm 52. A ring 53 in the bottom of the groove 50 prevents movement of the bearings and the parts which they support in a downward direction beyond a predetermined point.

Grease is forced into the groove 50 through the passageway 54 by means of any suitable forced feed device indicated diagrammatically at 55. The sections of the passageway 54 are held in proper alinement by preventing relative rotative movement between the sections 46, 47 and 48 of the supporting structure in any preferred manner, such for example as dowel pins, not shown. Beneath the sections of the supporting housing there may be provided suitable gaskets 56 and 57 to prevent leakage of the supporting fluid under pressure and the sections are held tightly together by the pressure of the threaded cap 58 which is screwed down upon them.

In the modification of Figure 4, the load of each bearing is transmitted through suitable bushings 59, 60 and 61 to individual annular grooves 62, 63 and 64, provided with the cup leather flexible diaphragms 65, 66 and 67 and rings 68, 69 and 70. These grooves communicate by means of passages 71 and 72 and grease is forced in through a passageway in the base 73 which may communicate with one or more of the annular grooves as desired. In this modification as well as in the construction of Figure 2, it is necessary to have the bearing area on the bottom face of each bushing 59, 60 and 61 approximately equal, and for this reason the thickness of each bushing must be increased as the center is approached, as shown.

In Figures 5 and 6 we have shown the grease, or other fluid, as enclosed in a diaphragm having the form of a continuous flexible annular bag or tube. In Figure 5 we have illustrated a round bag 74 and in Figure 6 a square one 75.

It will be noted that in all these constructions the equalizing fluid is held in a confined space in a chamber formed between the under faces of the bearing supporting bushings and the walls of the groove in which the fluid or grease is forced. The bearing supporting bushings or rings form, as it were, a sectional cap or cover which fits down into the groove, the bushings being capable of slight relative vertical movement under the influence of any inequality in the proportion of the load which each bearing is carrying. The bearing supporting bushings or rings act as plungers or pistons within the groove or grooves. In each instance, the flexible diaphragm acts as a yielding retaining means for the fluid being interposed between it and the piston of the load-transmitting means.

As shown, each and every flexible diaphragm can be inserted in place and removed separately from the associated piston or pistons.

We claim:

1. In an end thrust receiving device for a shaft, the combination with a plurality of bearings for taking the end thrust of the shaft and individual load transmitting means including annular pistons for the respective bearings one within another, of means for receiving and equalizing the load from and between said bearings comprising a common supply of fluid and a common flexible diaphragm interposed between the fluid and the pistons.

2. In an end thrust receiving device for a shaft, the combination with a plurality of bearings for taking the end thrust of the shaft and individual load-transmitting means including annular pistons for the respective bearings, of means for receiving and equalizing the load from and between said bearings comprising a common supply of fluid, and flexible diaphragm means insertible in place and removable separately from the pistons interposed between them and the fluid.

3. In an end thrust receiving device for a shaft, the combination with a plurality of bearings for taking the end thrust of the shaft and individual load-transmitting means including annular pistons for the respective bearings, of means for receiving and equalizing the load from and between said bearings comprising a common supply of fluid and flexible diaphragm means interposed between the fluid and the pistons.

4. In an end thrust receiving device for a shaft, the combination with a plurality of bearings for taking the end thrust of the shaft and individual load-transmitting means including annular pistons for the respective bearings, of means for receiving and equalizing the load from and between said bearings comprising separate chambers for the respective pistons, a common supply of fluid for the chambers, and flexible diaphragms interposed between the fluid and the respective pistons.

5. In an end thrust receiving device for a shaft, the combination with a plurality of superposed bearings for taking the end thrust of the shaft and individual load-transmitting means for the respective bearings, of means for receiving and equalizing the load from and between said bearings comprising separate chambers for the respective bearings, a common supply of fluid for the chambers, and a flexible diaphragm interposed between the fluid in each chamber and the corresponding load-transmitting means.

6. In an end thrust receiving device for a shaft, the combination with a plurality of superposed bearings for taking the end thrust of the shaft and individual load-transmitting means for the respective bearings, of means for receiving and equalizing the load from and between said bearings comprising superposed annular sections with intercommunicating chambers for the respective bearings, a common supply of fluid for the chambers, and a flexible diaphragm interposed between the fluid in each chamber and the corresponding load-transmitting means.

In testimony whereof, we have hereunto signed our names.

JOHN A. WINTROATH.
SAMUEL N. HALL.
MAHLON E. LAYNE.